United States Patent [19]

Li

[11] Patent Number: 5,131,704
[45] Date of Patent: Jul. 21, 1992

[54] APPARATUS FOR HYGIENIC COLLECTION AND DISPOSAL OF ANIMAL WASTE

[75] Inventor: Sze-Yee Li, Kowloon, Hong Kong

[73] Assignee: Kwoon Kwen Metal Ware Company, Limited, Kowloon, Hong Kong

[21] Appl. No.: 533,428

[22] Filed: Jun. 5, 1990

[51] Int. Cl.[5] .................... A01K 29/00; E01H 1/12
[52] U.S. Cl. ............................... 294/1.4; 294/55
[58] Field of Search .................. 294/1.4, 1.5, 1.1, 1.3, 294/19.1, 55; 15/257.1, 257.4; 248/99, 101

[56] References Cited

U.S. PATENT DOCUMENTS

| | | | |
|---|---|---|---|
| 3,132,794 | 5/1964 | Frazier | 248/99 X |
| 3,777,708 | 12/1973 | Vogt | 294/1.5 |
| 3,810,670 | 5/1974 | Turi | |
| 3,872,831 | 3/1975 | Cassidy | 248/101 X |
| 3,937,509 | 2/1976 | Hufnagel | 294/1.4 |
| 3,977,422 | 8/1976 | Cabaluna | 294/1.4 |
| 3,984,139 | 10/1976 | Battaglia | 294/1.4 |
| 4,003,595 | 1/1977 | Fano et al. | 294/1.5 |
| 4,103,953 | 8/1978 | LaChance | |
| 4,287,701 | 9/1981 | Washington | 248/99 |
| 4,338,979 | 7/1982 | Dow | 248/101 X |
| 4,447,082 | 5/1984 | Lindholm | |
| 4,641,873 | 2/1987 | Nurnberger | |
| 4,723,803 | 2/1988 | Sapp | 295/55 |

FOREIGN PATENT DOCUMENTS 2804553 8/1979 Fed. Rep. of Germany ....... 294/1.5
7902410 9/1980 Netherlands .................. 294/1.5

Primary Examiner—Johnny D. Cherry
Attorney, Agent, or Firm—Fleit, Jacobson, Cohn, Price, Holman & Stern

[57] ABSTRACT

An elongated wand member is provided including a first handle end and a second end from which an annular frame is supported with its medial plane inclined generally 45° relative to the longitudinal extent of the wand member. The end of the wand member adjacent the frame includes a transverse guide eye and the side of the frame remote from the wand member includes a second guide eye. The longitudinal mid-portion of an elongated, flexible and elastic tension member is received through the second guide eye and extends in opposite directions therefrom about the outer periphery of the frame and thereafter through the first wand member supported guide eye. The free ends of the tension member extend along the wand member toward the handle end thereof and are anchored relative to an anchor slide mounted from the wand member for guided movement therealong and anchorable in selected shifted position on the wand member adjacent the handle end thereof with the tension member in a longitudinally tensioned condition. The open end of a refuse bag extends through the frame and is peripherally notched and reversely bent over the outer periphery of the frame and releasably clamped between the latter and the longitudinally tensioned tension member.

15 Claims, 1 Drawing Sheet

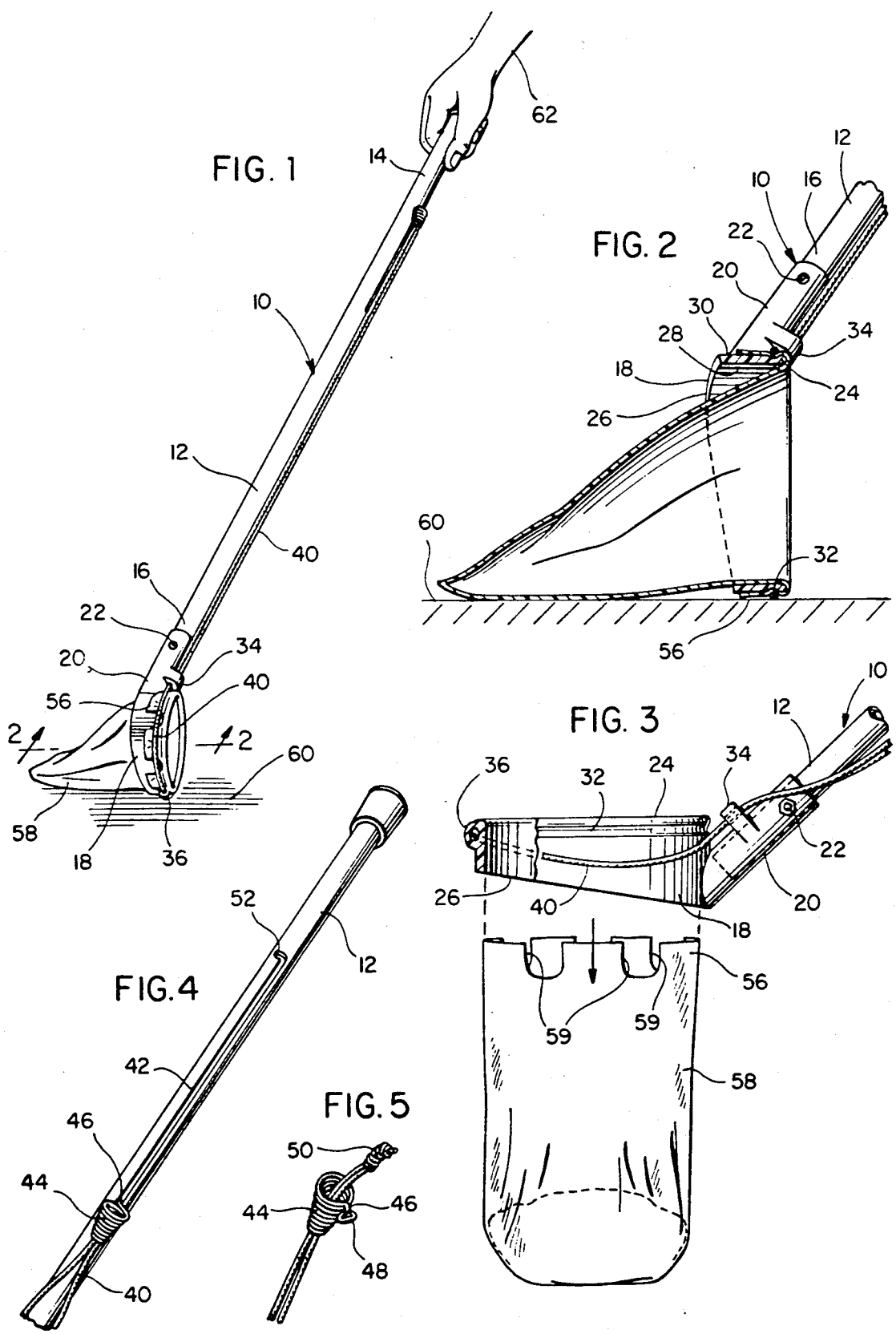

APPARATUS FOR HYGIENIC COLLECTION AND DISPOSAL OF ANIMAL WASTE

BACKGROUND OF THE INVENTION

1. Field of the Invention

This invention relates to a wand-type apparatus for releasably supporting the open end of a refuse bag therefrom and in a manner whereby the wand-type apparatus may be used to collect animal waste before it drops to the ground or other horizontal surface with the supported bag containing the animal waste until it is convenient to dispose of the bag and the animal waste therein, and to pick up animal waste from the ground.

2. Description of Related Art

Various different forms of animal waste pick-up devices including some of the general structural and operational features of the invention heretofore have been provided. Examples of the previous known structures are disclosed in U.S. Pat. Nos. 3,810,670, 3,937,509, 4,103,953, 4,447,082 and 4,641,873. However, these previously known devices do not include the overall combination of structural and operational features incorporated in the instant invention.

SUMMARY OF THE INVENTION

The apparatus of the instant invention includes an elongated wand member having first and second ends with the first end defining a hand grip end and an axially short, generally cylindrical frame carried by the second end of the wand member with the wand member disposed entirely exteriorly of the frame and the juncture between the wand member and the frame spaced from one axial end of the frame, the medial plane of the frame being inclined generally 45° relative to the longitudinal extent of the wand member.

The cylindrical frame is designed to have the open end of a flexible bag inserted therethrough from the second end thereof and with the open end of the bag reversely turned over the aforementioned one end of the frame. An elongated, flexible elastic tension member is looped about the outer periphery of the frame member for clamping the reversely turned open end of the bag about the outer periphery of the aforementioned one end of the frame and the end of the wand member adjacent the frame member is provided with guide structure through which the opposite ends of the tension member are slidably received, the free ends of the tension member being positioned adjacent the hand grip end of the wand member.

The main object of this invention is to provide an apparatus which may used to catch and collect animal waste before it falls upon the ground or some other horizontal surface such as a street or curb. The apparatus is constructed to support a refuse bag in open position therefrom in, a manner such that animal waste may readily drop thereinto or scooped up into the bag from the ground, without any portion of the animal waste coming in contact with the wand member or bag supporting frame member of the apparatus.

A further object of this invention is to provide an apparatus for picking up animal waste constructed in a manner whereby a refuse bag supported therefrom may be readily maintained in supported position from the apparatus until a suitable waste receptacle is available into which the refuse bag may be then dropped by remote control.

Another very important object of this invention is to provide an animal waste collection apparatus which may be conveniently used for animal waste collection operations by a standing person.

Yet another object of this invention is to provide an animal waste pick up apparatus which also may be used as a prod to ward off undesirable animals.

A final object of this invention to be specifically enumerated herein is to provide an animal waste pick up apparatus in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 is a perspective view of the animal waste pick up apparatus of the instant invention in position to pick up animal waste from a horizontal surface upon which the operator may be standing;

FIG. 2 is an enlarged fragmentary vertical sectional view taken substantially upon the plane indicated by the section line 2—2 of FIG. 1;

FIG. 3 is a fragmentary side elevational view of the refuse bag supporting frame member in a position to collect animal waste before it drops to the ground and with the associated flexible elastic tension member in a relaxed condition in order to release the refuse bag for dropping from engagement with the frame member, parts of the frame member being broken away and illustrated in vertical section;

FIG. 4 is an enlarged fragmentary perspective view of the upper end portion of the wand member illustrating the manner in which the anchor slide supported therefrom may be positioned to release the tension on the associated flexible elastic tension member; and FIG. 5 is a perspective view illustrating the manner in which the two ends of the elongated, flexible and elastic tension member are knotted together and releasably anchored relative to the anchor slide.

DESCRIPTION OF THE PREFERRED EMBODIMENT

Referring now more specifically to the drawings the numeral 10 generally designates the animal waste collecting and pick-up apparatus of the instant invention. The apparatus 10 includes a elongated, tubular wand member 12 having a first handle defining end 14 and a second end 16. An axially short, cylindrical open frame member 18 is provided and includes a radially outwardly projecting and inclined tubular shank 20 in which the second end 16 of the wand member 12 is removably secured through the utilization of a diametric fastener 22. The tubular shank 20 is inclined approximately 45° relative to the medial plane of the frame member 18 and the tubular shank 20 is spaced from one end 24 of the frame member 18.

The frame member 18 includes a second open end 26, bevelled generally 10°, remote from the open first end 24 and inner and outer peripheries 28 and 30. The tubular shank 20 projects outwardly from the outer periphery 30 and the inner periphery 28 of the frame member 18 is totally devoid of any portions of the tubular shank 20 or wand member 12 projecting inwardly thereof.

The outer periphery 30 of the first end 24 of the frame member 18 includes a circumferentially extending outwardly opening groove 32 and the tubular shank 20 includes a guide eye 34 disposed closely adjacent that portion of the groove 32 adjacent the tubular shank 20. In addition, the outer periphery 30 of the frame member 18 includes a second guide eye 36 diametrically opposite the point of connection of the tubular shank 20 with the frame member 18.

An elongated, flexible and elastic tension member 40 is provided and the longitudinal mid-portion of the tension member 40 is slidingly received through the guide eye 36, the opposite end portions of the tension member 40 extending in opposite directions about the outer periphery 30 of the frame member 18 from the guide eye 36 and passing through the guide eye 34 and thereafter upwardly along the wand member 12 toward the handle defining end 14 thereof.

The upper end portion of the wand member 12 is provided with an L-shaped slot 42 and a slide anchor 44 comprising a spiral wound hollow truncated cone is provided and includes a laterally outwardly directed shank 46 at the base of its large diameter end from which an enlarged head 48 is supported. The shank 46 extends through the slot 42 and the head 48 is held captive within the tubular wand member 12. In addition, the free ends of the tension member 40 are passed through the small diameter end of the spiral wound conical slide anchor 44 and knotted as at 50, whereby the tension member ends are anchored within the small diameter end of the interior of the slide anchor 44 against retraction therefrom.

When the slide anchor 44 is supported from the lower end of the slot 42, the tension member 40 is relaxed in the manner illustrated in FIGS. 3 and 4. However, when the slide anchor 44 is shifted to the upper end of the slot 42 and retained in the horizontal upper end extremity 52 thereof, the tension member 40 is longitudinally tensioned.

It is pointed out that the elastic, flexible tension member 40 includes an exterior surface which does not offer frictional resistance to movement of the tension member 40 over the outer periphery surfaces of the frame member 18 or through the guide eye 34. Not only is the outer surface of the tension member 40 constructed not to generate frictional resistance, but the frame member and tubular shank as well as the guide eye 34 are constructed of a material having a low coefficient of friction.

When it is desired to ready the apparatus 10, the slide anchor 44 is positioned in the end of the slot 42 adjacent the frame member 18 so as to place slack in the tension member 40. Then, the open end 56 of a refuse bag 58 is inserted through the frame member 18 from the second end 26 thereof and the open end 56 of the bag 58, having peripherally spaced notches 59 formed therein, is thereafter turned back over the outer periphery 30 of the frame member 28, in the manner illustrated in FIGS. 1 and 2. Then, the slide anchor 40 is shifted along the slot 42 and engaged in the horizontal upper end 52 thereof, whereby those portions of the tension member 40 extending about the frame member 18 are tensioned and clampingly engage the open end 56 in the groove 32. Then, the apparatus 10 may be utilized in the manner illustrated in FIG. 1 in order to pick up animal waste from a horizontal surface 60 upon which the operator 62 of the apparatus 10 is standing. In addition, and primarily, the apparatus 10 may be held beneath the rear of an animal with the bevelled second end 26 closely spaced above and paralleling the ground such that solidified waste being expelled from the animal may fall directly through the open upper first end 24 of the frame member 18 and into the bag 58. This of course obviates picking up solid waste from the surface 60 after such solid waste has fallen thereon. Accordingly, the axially short tubular frame member 18 and the bevelled second open end 26 thereof in relation to the positioning of the tubular shank 20 play an important part in the overall adaptability of the apparatus 10 for collecting animal waste before the animal waste falls upon the ground.

It is also pointed out that the length of the wand member 12 is sufficient to enable a standing person to collect or pick up animal waste from the surface 60 while the wand member 12 is inclined at least 20° relative to the vertical. In this manner, the guide eye 36 carried by the side of the frame member 18 remote from the tubular shank 20 does not contact the surface 60 and the frame member 18 may be disposed in close juxtaposition with the surface 60. Further, the frame member 18 may be constructed to include a cross sectional shape other than circular, but the use of a circular frame member (or at least a substantially circular member) ensures minimum sliding frictional resistance between the tension member and the opposing surfaces of the refuse bag 58 when the slide anchor 44 is shifted to its uppermost position on the wand member 12. Also, the frame member 18 is inclined generally 45° relative to the longitudinal extent of the wand member 12 in order that the frame member 18 may be most advantageously positioned during an animal waste collection operation.

In lieu of the guide eye 36, all but those portions of the outer periphery 30 of the frame member 18 furthermost from the guide eye 34 could be provided with parallel circumferentially extending and outwardly projecting guide flanges between which to receive the adjacent portions of the tension member 40. Such flanges would taper toward or be eliminated entirely in the 90° quadrant of the frame member 18 furthermost from the tubular shank 20 in order that the outer periphery 30 of the frame member 18 closest to the surface 60 during an animal waste pick-up operation could be positioned juxtapose to the surface 60. Further, the notches 59 in the open end of the bag enable the bag to more easily drop from engagement with the frame member 18 when tension on the tension member 40 is released.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An apparatus for hygienic collection of animal waste before dropping to the ground and for pick-up of ground supported animal waste and disposal thereof, said apparatus including an elongated wand member having first and second ends, said first end defining a hand grip end, an axially short shape retentive support frame member having inner and outer peripheries, opposite open ends and defining a passageway therethrough, one peripheral portion of said support frame member being supported from said second end of said wand member with said passageway inclined relative to the longitudinal extent of said wand member and with said wand member disposed to the exterior of said frame member and spaced from one end of said support frame member toward the other end thereof, said support frame member one end including outer periphery tension member support means carried thereby remote from said wand member, one of said wand and frame members, adjacent the area of support of said one peripheral portion of said support frame member from said second end of said wand member, including tension member guide means, a pair of tension member sections including first and second end portions, said first end portions being supported from said support means with said tension member sections extending in opposite directions about the outer periphery of said frame member from said support means toward and lengthwise slidingly and guidingly received through said guide means, said first and second end portions extending along said wand member from said guide means toward said first end thereof, said tension member sections and said outer periphery, adjacent said one end of said shape retentive frame member, being adapted to frictionally grip therebetween a reversely folded open mouth end of a flexible material refuse bag inserted through said support frame member from the other end of said frame member and directed back over the outer periphery of said open frame member one end.

2. The apparatus of claim 1 including anchor means anchoring said second end portions together.

3. The apparatus of claim 2 wherein said anchor means includes a slide slidably mounted on said wand member for guided movement therealong.

4. The apparatus of claim 3 wherein said tension member sections comprise elastic tension member sections.

5. The apparatus of claim 4 wherein said slide and wand member include co-acting means operative to releasably anchor said slide in a predetermined position on said wand member adjacent said one end thereof with said elastic tension member sections in tensioned, elongated condition.

6. The apparatus of claim 5 wherein said tension members include outer surfaces specifically designed to slide over the opposing outer peripheral surfaces of said reversely turned open end of said bag and relative to said guide means with minimum friction.

7. The apparatus of claim 1 wherein said tension member sections comprise opposite end portions of a single tension member, said tension member support means defining a guide eye through which a longitudinal mid-portion of said tension member extends.

8. The apparatus of claim 7 including anchor means anchoring said second end portions together.

9. The apparatus of claim 8 wherein said anchor means includes a slide slidably mounted on said wand member for guided movement therealong.

10. The apparatus of claim 9 wherein said tension member sections comprise elastic tension member sections.

11. The apparatus of claim 10 wherein said slide and wand member include co-acting means operative to releasably anchor said slide in a predetermined position on said wand member adjacent said one end thereof with said elastic tension member sections in tensioned, elongated condition.

12. The apparatus of claim 1 wherein said guide means is supported from said wand member closely adjacent the outer periphery of said frame member.

13. The apparatus of claim 1 wherein the medial plane of said frame member is inclined generally 45° relative to the longitudinal extent of said wand member.

14. The apparatus of claim 13 wherein the effective length of said wand member is sufficient to enable a standing person to engage a horizontal surface upon which he is standing with said support frame member while supporting said wand member in a position inclined at least 20° relative to the vertical.

15. The apparatus of claim 1 wherein said other end of said support frame member is bevelled toward the peripheral portion of said support frame member opposite said one peripheral portion thereof.

* * * * *